United States Patent
Tang et al.

(10) Patent No.: US 6,864,803 B2
(45) Date of Patent: Mar. 8, 2005

(54) SYSTEM AND METHOD FOR TIRE PRESSURE MONITORING USING CDMA TIRE PRESSURE SIGNALS

(75) Inventors: Qingfeng Tang, Novi, MI (US); John S. Nantz, Brighton, MI (US); Riad Ghabra, Dearborn Heights, MI (US); Salman Khreizat, Dearborn, MI (US); Ronald O. King, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 481 days.

(21) Appl. No.: 09/977,157

(22) Filed: Oct. 12, 2001

(65) Prior Publication Data

US 2003/0071742 A1 Apr. 17, 2003

(51) Int. Cl.[7] ............................................. G08B 21/00
(52) U.S. Cl. .................. 340/870.16; 340/442; 340/447; 73/146.2
(58) Field of Search ..................... 340/870.16, 442–449; 73/146, 146.2

(56) References Cited

U.S. PATENT DOCUMENTS

| | | | |
|---|---|---|---|
| 3,580,353 A | 5/1971 | Thompson | |
| 3,916,688 A | 11/1975 | Dendy et al. | |
| 4,067,235 A | 1/1978 | Markland et al. | |
| 4,101,870 A | 7/1978 | Ekman | |
| 4,330,774 A | 5/1982 | Doty | |
| 4,450,431 A | 5/1984 | Hochstein | |
| 4,468,650 A | 8/1984 | Barbee | |
| 4,570,152 A | 2/1986 | Melton et al. | |
| 4,660,528 A | 4/1987 | Buck | |
| 4,670,845 A | 6/1987 | Etoh | |
| 4,717,905 A | 1/1988 | Morrison, Jr. et al. | |
| 4,749,993 A | 6/1988 | Szabo et al. | |
| 4,951,208 A | 8/1990 | Etoh | |
| 5,040,561 A | 8/1991 | Achterholt | |
| 5,109,213 A | 4/1992 | Williams | |
| 5,156,230 A | 10/1992 | Washburn | |
| 5,165,497 A | 11/1992 | Chi | |
| 5,289,160 A | 2/1994 | Fiorletta | |
| 5,444,448 A | 8/1995 | Schuermann et al. | |
| 5,451,959 A | 9/1995 | Schuermann | |
| 5,461,385 A | 10/1995 | Armstrong | |
| 5,463,374 A | 10/1995 | Mendez et al. | |
| 5,473,938 A | 12/1995 | Handfield et al. | |
| 5,479,171 A | 12/1995 | Schuermann | |
| 5,483,827 A | 1/1996 | Kulka et al. | |
| 5,485,381 A | 1/1996 | Heintz et al. | |
| 5,500,637 A | 3/1996 | Kokubu | |
| 5,562,787 A | 10/1996 | Koch et al. | |

(List continued on next page.)

FOREIGN PATENT DOCUMENTS

| | | |
|---|---|---|
| EP | 1059177 | 12/2000 |
| EP | 1 172 236 | 1/2002 |
| WO | WO 98/26946 | 6/1998 |
| WO | WO 01/69803 | 9/2001 |
| WO | WO 02/057097 | 7/2002 |

OTHER PUBLICATIONS

Search Report of Counterpart Foreign Application No. GB 0223417.7 dated Mar. 14, 2003.

Primary Examiner—Timothy Edwards
(74) Attorney, Agent, or Firm—Bill C. Panagos

(57) ABSTRACT

A system and method for monitoring vehicle tire pressure. A tire monitor for each tire includes a pressure sensor for sensing tire pressure and a transmitter for transmitting a signal representative of the sensed tire pressure. A receiver for mounting on the vehicle receives the tire pressure signals. The transmitters and the receiver utilize code division multiple access (CDMA) for the tire pressure signals so that tire pressure signals transmitted simultaneously by the transmitters can be received by the receiver. A controller for mounting on the vehicle communicates with the receiver and collects and processes the tire pressure signals, and generates control signals for use in conveying tire pressure information to a vehicle occupant.

19 Claims, 1 Drawing Sheet

U.S. PATENT DOCUMENTS

| | | |
|---|---|---|
| 5,573,610 A | 11/1996 | Koch et al. |
| 5,573,611 A | 11/1996 | Koch et al. |
| 5,585,554 A | 12/1996 | Handfield et al. |
| 5,600,301 A | 2/1997 | Robinson, III |
| 5,602,524 A | 2/1997 | Mock et al. |
| 5,654,689 A | 8/1997 | Peyre et al. |
| 5,661,651 A | 8/1997 | Geschke et al. |
| 5,670,933 A | 9/1997 | Hayashi |
| 5,677,667 A | 10/1997 | Lesesky |
| 5,705,746 A | 1/1998 | Trost et al. |
| 5,717,376 A | 2/1998 | Wilson |
| 5,724,028 A | 3/1998 | Prokup |
| 5,728,933 A | 3/1998 | Schultz et al. |
| 5,740,548 A | 4/1998 | Hudgens |
| 5,741,966 A | 4/1998 | Handfield et al. |
| 5,753,809 A | 5/1998 | Ogusu et al. |
| 5,760,682 A | 6/1998 | Liu et al. |
| 5,774,047 A | 6/1998 | Hensel, IV |
| 5,783,992 A | 7/1998 | Eberwine et al. |
| 5,822,683 A | 10/1998 | Paschen |
| 5,835,868 A | 11/1998 | McElroy et al. |
| 5,838,229 A | 11/1998 | Robinson, III |
| 5,844,130 A | 12/1998 | Hilgart et al. |
| 5,853,020 A | 12/1998 | Widner |
| 5,880,363 A | 3/1999 | Meyer et al. |
| 5,900,808 A | 5/1999 | Lebo |
| 5,926,087 A | 7/1999 | Busch et al. |
| 5,939,977 A | 8/1999 | Monson |
| 5,942,971 A | 8/1999 | Fauci et al. |
| 5,959,365 A | 9/1999 | Mantini et al. |
| 5,963,128 A | 10/1999 | McClelland |
| 5,999,091 A | 12/1999 | Wortham |
| 6,002,327 A | 12/1999 | Boesch et al. |
| 6,025,777 A | 2/2000 | Fuller et al. |
| 6,034,596 A | 3/2000 | Smith et al. |
| 6,034,597 A | 3/2000 | Normann et al. |
| 6,043,738 A | 3/2000 | Stewart et al. |
| 6,043,752 A | 3/2000 | Hisada et al. |
| 6,053,038 A | 4/2000 | Schramm et al. |
| 6,060,984 A | 5/2000 | Braun et al. |
| 6,087,930 A | 7/2000 | Kulka et al. |
| 6,092,028 A * | 7/2000 | Naito et al. .................. 702/47 |
| 6,111,520 A | 8/2000 | Allen et al. |
| 6,112,587 A | 9/2000 | Oldenettel |
| 6,118,369 A | 9/2000 | Boesch |
| 6,127,939 A | 10/2000 | Lesesky et al. |
| 6,169,480 B1 | 1/2001 | Uhl et al. |
| 6,175,302 B1 | 1/2001 | Huang |
| 6,181,241 B1 | 1/2001 | Normann et al. |
| 6,204,758 B1 | 3/2001 | Wacker et al. |
| 6,232,875 B1 | 5/2001 | DeZorzi |
| 6,232,884 B1 | 5/2001 | Gabbard |
| 6,243,007 B1 | 6/2001 | McLaughlin et al. |
| 6,246,317 B1 | 6/2001 | Pickornik et al. |
| 6,252,498 B1 | 6/2001 | Pashayan, Jr. |
| 6,255,940 B1 | 7/2001 | Phelan et al. |
| 6,259,361 B1 | 7/2001 | Robillard et al. |
| 6,259,362 B1 | 7/2001 | Lin |
| 6,275,148 B1 | 8/2001 | Takamura et al. |
| 6,278,363 B1 | 8/2001 | Bezek et al. |
| 6,292,095 B1 | 9/2001 | Fuller et al. |
| 6,304,610 B1 | 10/2001 | Monson |
| 6,340,929 B1 | 1/2002 | Katou et al. |
| 6,408,690 B1 | 6/2002 | Young et al. |
| 6,417,766 B1 | 7/2002 | Starkey |
| 6,489,888 B1 | 12/2002 | Honeck et al. |
| 6,501,372 B2 | 12/2002 | Lin |
| 2001/0008083 A1 | 7/2001 | Brown |
| 2003/0006890 A1 * | 1/2003 | Magiawala et al. ......... 340/438 |

* cited by examiner

SYSTEM AND METHOD FOR TIRE PRESSURE MONITORING USING CDMA TIRE PRESSURE SIGNALS

TECHNICAL FIELD

The present invention relates generally to wireless vehicle tire pressure monitoring and, more particularly, to a system and method for wireless vehicle tire pressure monitoring using Code Division Multiple Access (CDMA) tire pressure signals.

BACKGROUND ART

It is known in the automotive industry to provide for wireless monitoring of vehicle tire parameters, particularly tire pressure. In such tire pressure monitoring systems, tire pressure sensors and radio frequency (RF) transmitters are mounted inside each tire, typically adjacent the inflation valve stem. In each tire, the tire pressure sensed by the tire pressure sensor is transmitted by the transmitter to a receiver located on-board the vehicle. The tire pressure information delivered to the receiver by the RF signals from the transmitters is subsequently conveyed to a vehicle operator or occupant, typically in the form of a display.

Exemplary tire pressure monitoring systems are described and shown in U.S. Pat. Nos. 6,112,587 and 6,034,597. Conventional tire pressure monitoring systems, however, employ simplified time division multiple access (TDMA) to multiplex each tire pressure signal transmitted by the transmitters. The greatest problem associated with such TDMA tire pressure signals is that collisions between tire pressure signals can occur when multiple transmitters transmit tire pressure signals at the same time. That is, when multiple transmitters simultaneously transmit tire pressure signals, the signals overlap with each other, which can cause problems in receiving the signals, as well as in conveying accurate tire pressure information to the vehicle occupant.

Such collision problems will worsen as tire pressure monitoring systems become more common, with more and more vehicles so equipped. As more vehicles are equipped with tire pressure monitoring systems, such systems are likely to jam each other when the vehicles on which the systems are installed are within an approximate range of 20 to 30 meters from each other. That is, tire pressure signals transmitted by transmitters located in the tires of the nearby vehicles may overlap or collide, which can disrupt proper operation of the tire pressure monitoring system in each vehicle. This may be particularly problematic when such jamming occurs on the road where, for safety purposes, proper operation of a vehicle tire pressure monitoring system is especially important.

Thus, there exists a need for an improved tire pressure monitoring system and method which overcomes the tire pressure signal jamming problem described above. Such a system and method would allow for simultaneous transmission of tire pressure signals from multiple transmitters, and at the same frequency. To do so, such a system would employ spread spectrum technology, preferably through the use of code division multiple access (CDMA). According to such a system and method, the transmitters and receiver would employ CDMA so that multiple tire pressure signals transmitted simultaneously could be received by the receiver, without disruption of conveying tire pressure information to the vehicle occupant. Such a system and method would thereby provide for proper tire pressure monitoring regardless of the proximity of a vehicle equipped with the system and method to another vehicle equipped with a tire pressure monitoring system.

SUMMARY OF THE INVENTION

Accordingly, the present invention provides an improved vehicle tire pressure monitoring system and method. More particularly, the present invention provides, in a vehicle having a plurality of tires, a system for monitoring tire pressure. The system comprises a plurality of tire monitors, each monitor for mounting in one of the plurality of tires, each monitor comprising means for determining tire pressure and a transmitter for transmitting a signal representative of the tire pressure determined, and a receiver for mounting on board the vehicle for receiving the tire pressure signals. The transmitters and the receiver utilize code division multiple access (CDMA) for the tire pressure signals so that tire pressure signals transmitted simultaneously by the transmitters can be received by the receiver. The system further comprises a controller for mounting on board the vehicle, the controller to be provided in communication with the receiver for collecting and processing the tire pressure signals, and for generating control signals for use in conveying tire pressure information to a vehicle occupant.

According to the present invention, a method is also provided for monitoring tire pressure in a vehicle having a plurality of tires. The method comprises providing a plurality of tire monitors, each monitor for mounting in one of the plurality of tires, each monitor comprising means for determining tire pressure and a transmitter for transmitting a signal representative of the tire pressure determined, and providing a receiver for mounting on board the vehicle for receiving the tire pressure signals, wherein the transmitters and the receiver utilize code division multiple access (CDMA) for the tire pressure signals so that tire pressure signals transmitted simultaneously by the transmitters can be received by the receiver. The method further comprises providing a controller for mounting on board the vehicle, the controller to be provided in communication with the receiver for collecting and processing the tire pressure signals, and for generating control signals for use in conveying tire pressure information to a vehicle occupant.

These and other features and advantages of the present invention will be readily apparent upon consideration of the following detailed description of the invention in conjunction with the accompanying drawings.

BEST MODE FOR CARRYING OUT THE INVENTION

Figure 1:
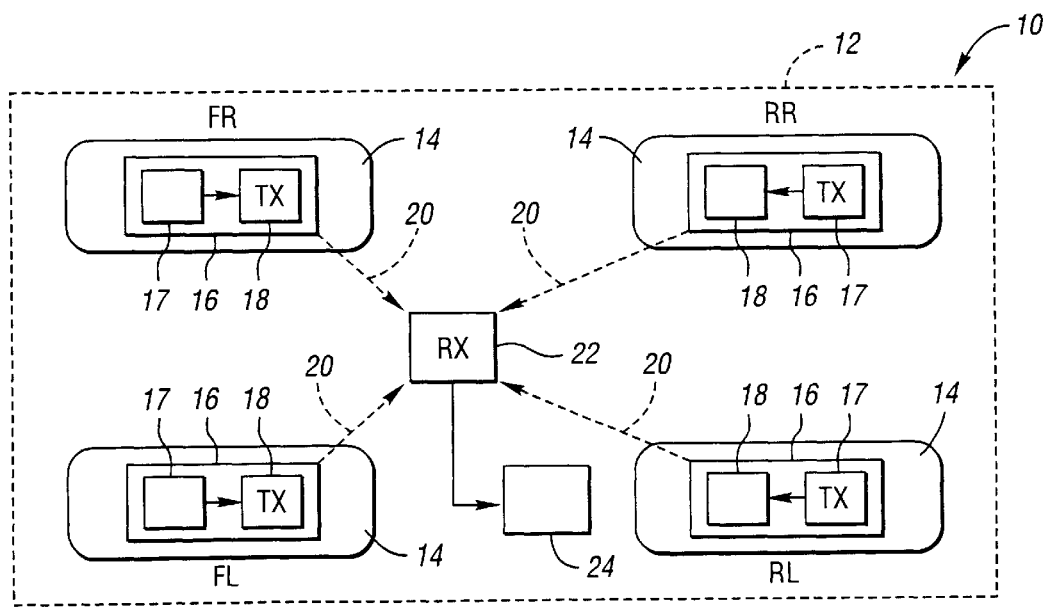
FIG. 1 is a simplified, representative block diagram of the tire pressure monitoring system of the present invention.
Figure 2:
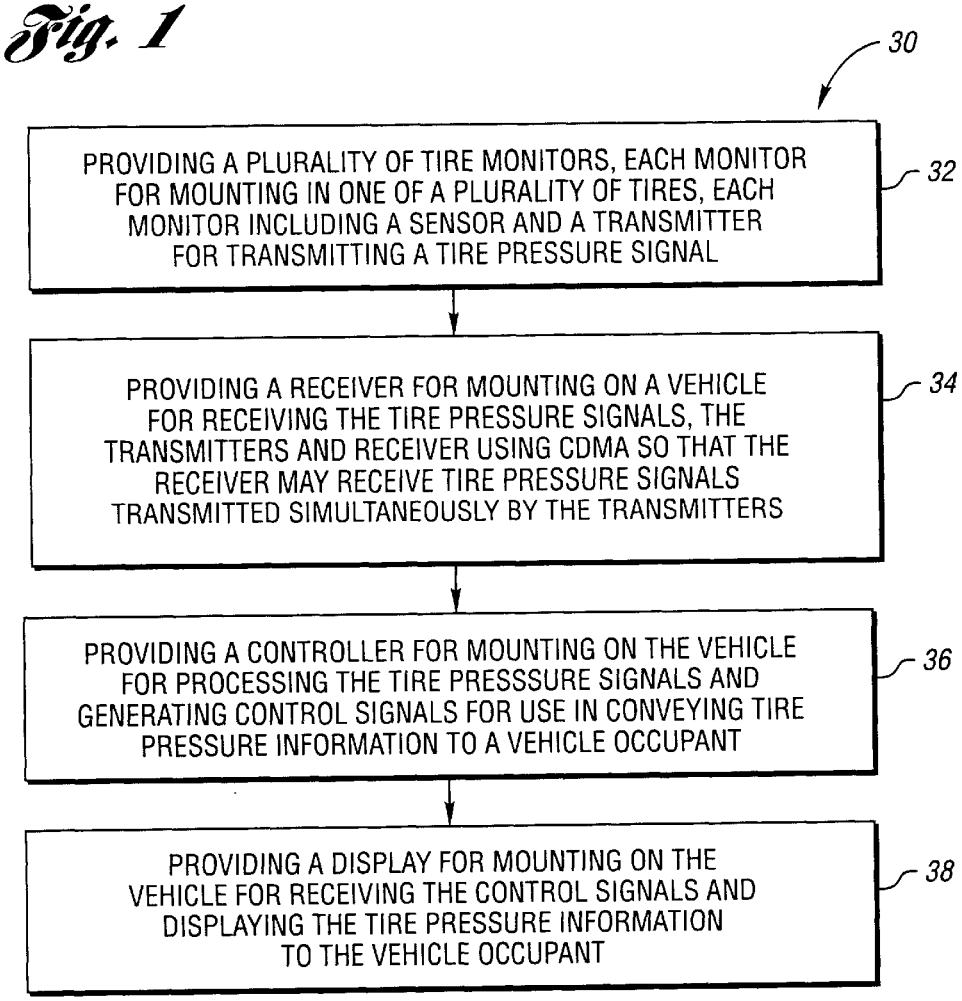
FIG. 2 is a simplified, representative flowchart of the tire pressure monitoring method of the present invention.

Referring to FIGS. 1 and 2, the preferred embodiment of the present invention will now be described. As previously noted, it is known in the automotive industry to provide for wireless monitoring of vehicle tire parameters, particularly tire pressure. In such known tire pressure monitoring systems, tire pressure sensors and radio frequency (RF) transmitters are mounted inside each tire, typically adjacent the inflation valve stem. In each tire, the tire pressure sensed by the tire pressure sensor is transmitted by the transmitter to a receiver located on-board the vehicle. The tire pressure information delivered to the receiver by the RF signals from the transmitters is subsequently conveyed to a vehicle operator or occupant, typically in the form of a display.

Conventional tire pressure monitoring systems, however, employ simplified time division multiple access (TDMA) to multiplex each tire pressure signal transmitted by the transmitters. The greatest problem associated with such TDMA tire pressure signals is that collisions between tire pressure signals can occur when multiple transmitters transmit tire pressure signals at the same time. That is, when multiple transmitters simultaneously transmit tire pressure signals, the signals overlap with each other, which can cause problems in receiving the signals, as well as in conveying accurate tire pressure information to the vehicle occupant.

Such collision problems will worsen as tire pressure monitoring systems become more common, with more and more vehicles so equipped. As more vehicles are equipped with tire pressure monitoring systems, such systems are likely to jam each other when the vehicles on which the systems are installed are within an approximate range of 20 to 30 meters from each other. That is, tire pressure signals transmitted by transmitters located in the tires of the nearby vehicles may overlap or collide, which can disrupt proper operation of the tire pressure monitoring system in each vehicle. This may be particularly problematic when such jamming occurs on the road where, for safety purposes, proper operation of a vehicle tire pressure monitoring system is especially important.

Thus, as also previously noted, there exists a need for an improved tire pressure monitoring system and method which overcomes the tire pressure signal jamming problem described above. The present invention provides such a system and method, allowing for simultaneous transmission of tire pressure signals from multiple transmitters, and at the same frequency. To do so, the system and method of the present invention employ spread spectrum technology, preferably through the use of code division multiple access (CDMA). According to the system and method of the present invention, transmitters and a receiver employ CDMA so that multiple tire pressure signals transmitted simultaneously can be received by the receiver, without disruption of conveying tire pressure information to a vehicle occupant. The system and method of the present invention thereby provide for proper tire pressure monitoring regardless of the proximity of a vehicle equipped with the system and method of the present invention to another vehicle equipped with a tire pressure monitoring system.

Referring now to FIG. 1, a simplified, representative block diagram of the tire pressure monitoring system of the present invention is shown, denoted generally by reference numeral 10. As seen therein, the system (10) is designed for use in a vehicle (12) having a plurality of tires (14), such as front left (FL), front right (FR), rear left (RL), and rear right (RR). It should be noted here that while the present invention is described and shown herein for use in an automotive vehicle having four tires, such an environment is exemplary only. That is, the present invention is suitable for use in any type of vehicle having any number of tires.

Still referring to FIG. 1, the system (10) includes a plurality of tire monitors (16). Each tire monitor (16) is provided for mounting in one of the plurality of tires (14). In that regard, each tire monitor (16) is preferably located inside the tire (14) adjacent the tire inflation valve stem (not shown), although any mounting location known in the art may be used. Each tire monitor (16) includes means, preferably an appropriate sensor (17) and/or other devices, for sensing, monitoring and/or determining at least the pressure of the associated tire (14). It should be noted, however, that each tire monitor (16) may also be equipped to sense, monitor and/or determine any number of tire parameters in addition to pressure including, but not limited to, temperature, status (i.e., whether or not the tire is in motion) and/or speed, in any fashion well known to those of ordinary skill in the art.

Each tire monitor (16) also includes a transmitter (18) in communication with sensor (17) for transmitting a signal (20) representative of the sensed tire pressure. In that regard, tire pressure signal (20) is preferably a radio frequency (RF) signal, although other signal types known in the art could be employed. It should be noted that transmitter (18) may also transmit as part of or separate from tire pressure signal (20) a signal or signals representative of information concerning any of a number of other tire parameters in addition to pressure such as temperature, status and/or speed as sensed, measured and/or determined by an appropriately equipped tire monitor (16). As will be described in greater detail below, such tire pressure information, together with information concerning any other tire parameters, is ultimately conveyed to a vehicle operator, typically via a visual display, although audible means such as tones or speech may also be used.

As is well known in the art, each transmitter (18) is powered by a suitable battery (not shown). As a result, to extend battery life, rather than transmit tire pressure signals (20) continuously, each transmitter (18) transmits its tire pressure signal (20) intermittently according to a period. In that regard, the particular period employed for such transmissions is not critical, and may be the same for each transmitter (18), or may differ from transmitter (18) to transmitter (18). Additionally, the period may be fixed, or may vary in any fashion, including specific or random periods. In any event, as noted above, periodic transmission of tire pressure signals (20) by transmitters (18) provides for extended battery life. It should also be noted that, for the same purpose, tire pressure signals (20) may be transmitted periodically by transmitters (18) only when the tires (14) are in motion, or only when the rotational speed of the tires (14) exceeds a selected threshold.

In that regard, referring still to FIG. 1, the tire pressure monitoring system (10) of the present invention also includes a receiver (22) for mounting onboard the vehicle (12) for receiving the tire pressure signals (20) transmitted by transmitters (18). Receiver (22) comprises one or more antenna (not shown), each provided to be located at one or more selected sites on the vehicle (12). Receiver (22) also comprises a receiver housing (not shown). The one or more antenna that are part of receiver (22) may either be integrated inside the receiver housing, or located external to the housing. As is readily apparent, if the one or more antenna are integrated inside the receiver housing, then receiver (22) is located on the vehicle at the same site of the one or more antenna. Alternatively, if the one or more antenna are located external to the receiver housing, then receiver (22) may be located at a different site on the vehicle than the one or more antenna. In such an embodiment, with the one or more antenna located external to the receiver housing, receiver (22) could be located at a similar vehicle site on any type of vehicle in which the present invention is employed.

Significantly, the system (10) allows for simultaneous transmission of tire pressure signals (20) from multiple transmitters (18), preferably at the same frequency. In that regard, spread spectrum technology is employed, preferably through the use of code division multiple access (CDMA). That is, rather than prior art time division multiple access (TDMA), transmitters (18) and receiver (22) utilize CDMA for the tire pressure signals (20) so that the receiver (22) may receive multiple tire pressure signals (20) transmitted simultaneously by the transmitters (18). That is, different transmitters (18) may transmit tire pressure signals (20) during the same time period, such that the tire pressure signals (20) from those different transmitters (18) overlap. By utilizing CDMA, receiver (22) is capable of receiving such simultaneous tire pressure signals (20). In that regard, as used herein, the term simultaneously is intended to mean any period of time wherein tire pressure signals (20) from different transmitters (18) are being transmitted, with any portion of such tire pressure signals (20) overlapping. That is, while sufficient, it is not necessary for transmission of such tire pressure signals (20) by transmitters (18) to begin and end at the same time in order to be simultaneous, as that term is defined herein. In that regard, transmitters (18) and receiver (22) may be configured to employ CDMA in any conventional fashion. The system (10) thereby provides for conveying tire pressure information to a vehicle occupant without the signal jamming problems associated with prior art TDMA tire pressure monitoring systems. The system (10) provides for proper tire pressure monitoring regardless of the proximity of multiple vehicles equipped with tire pressure monitoring systems.

Referring still to FIG. 1, the system (10) of the present invention further comprises a controller (24) for mounting on-board vehicle (12) and to be provided in communication with receiver (22). Controller (24) is for collecting or sampling tire pressure signals (20) received by receiver (22) from transmitters (18), and for processing such tire pressure signals (20). Controller (24) is also for generating control signals (not shown) for use in conveying tire pressure information to a vehicle operator, typically via a display unit (not shown), such as an LED display or a lighted icon in the vehicle dashboard or a vehicle console. In that regard, controller (24) is preferably an appropriately programmed microcontroller or a digital signal processor (DSP), although other suitable hardware and/or software may also be used. Once programmed, controller (24) performs the previously described functions.

As noted above, information concerning other tire parameters, such as temperature, status and/or speed, may also be conveyed to the vehicle occupant. In that regard, each tire monitor (16) may further include suitable means, such as appropriate sensors and/or processors, for sensing, monitoring and/or determining tire status, tire speed and/or tire temperature, in any fashion known in the art. Each transmitter (18) is then further for transmitting one or more signals representative of the tire status, speed and/or temperature for receipt by the receiver (22). It should be noted that such tire status, speed and/or temperature signal or signals may be part of or separate from the tire pressure signals (20). The controller (24) is likewise further for collecting and processing the tire status, speed and/or temperature signal or signals. In that event, the control signals (not shown) generated by controller (24) are further for use in conveying tire status, speed and/or temperature information to the vehicle occupant.

In that regard, as noted above, the system (10) of the present invention may also comprise a display (not shown) for mounting on board the vehicle, the display to be provided in communication with the controller (24) for receiving the control signals and displaying the tire pressure information to the vehicle occupant. As also noted above, the display (not shown), may take the form of a display unit, such as an LED display or a lighted icon in the vehicle dashboard or a vehicle console. Depending upon the circumstances described above concerning other tire parameters, the display (not shown) may also be adapted for displaying tire status, speed and/or temperature information, as appropriate. Once again, it should be noted that the information may also be conveyed to the vehicle operator in an audible fashion, and may include a warning, which may also be audible, if tire pressure and/or other tire parameters, such as temperature, are outside recommended ranges.

Referring next to FIG. 2, a simplified, representative flowchart of the tire pressure monitoring method of the present invention is shown, denoted generally by reference numeral 30. The method (30) is for use in a vehicle having a plurality of tires. As seen in FIG. 3, the method (30) comprises providing (32) a plurality of tire monitors, each monitor for mounting in one of the plurality of tires, each monitor comprising means for determining tire pressure and a transmitter for transmitting a signal representative of the sensed tire pressure. The method (30) further comprises providing (32) a receiver for mounting on board the vehicle for receiving the tire pressure signals, wherein the transmitters and the receiver utilize code division multiple access (CDMA) for the tire pressure signals so that the receiver may simultaneously receive tire pressure signals transmitted simultaneously by the transmitters. The method (30) still further comprises providing (36) a controller for mounting on board the vehicle, the controller to be provided in communication with the receiver for collecting and processing the tire pressure signals, and for generating control signals for use in conveying tire pressure information to a vehicle occupant As previously described, each tire monitor is preferably located inside the tire adjacent the tire inflation valve stem, and includes an appropriate sensor and other devices for monitoring at least the pressure of the associated tire, as described above. In that regard, each tire monitor may also be suitably equipped to sense, determine and/or monitor any number of tire parameters in addition to pressure including, but not limited to, temperature, status and/or speed, in any fashion well known to those of ordinary skill in the art. The transmitters transmit a signal or signals representative of the sensed, monitored and/or determined tire pressure and/or other tire parameters, as appropriate. To extend transmitter battery life, each transmitter preferably transmits its tire pressure and/or other tire parameter signals intermittently according to a period, as described above in detail.

As also described previously, the receiver provided comprises a receiver housing and one or more antenna that may be integrated inside or located external to the receiver housing and which are located at one or more sites on the vehicle in the fashion described above. Once again, the method (30) allows for simultaneous transmission of tire pressure signals from multiple transmitters, preferably at the same frequency. In that regard, spread spectrum technology is employed, preferably through the use of code division multiple access (CDMA). That is, the transmitters and the receiver utilize CDMA for the tire pressure signals, rather than prior art time division multiple access (TDMA), so that the tire pressure signals may be transmitted simultaneously by the transmitters and received by the receiver. In such a fashion, the method (30) provides for conveying tire pressure information to a vehicle occupant without the signal jamming problems associated with prior art TDMA tire pressure monitoring systems. The method (30) provides for proper tire pressure monitoring regardless of the proximity of multiple vehicles equipped with tire pressure monitoring systems.

As also described above, the controller provided is preferably a microcontroller or a digital signal processor (DSP), appropriately programmed to performs the functions described in detail above concerning processing tire pressure and/or other signals, and generating control signals for use in conveying tire pressure and/or other tire parameter information to a vehicle occupant. The method of the present invention may further comprise providing (38) a display for mounting on board the vehicle, the display to be provided in communication with the controller for receiving the control signals and displaying the tire pressure information to the vehicle occupant. As noted above, the display may take the form of a display unit, such as an LED display or a lighted icon in the vehicle dashboard or a vehicle console, and may also be adapted for displaying tire status, speed and/or temperature information, as appropriate. Once again, it should be noted that the information may also be conveyed to the vehicle operator in an audible fashion, and may include a warning, which may also be audible, if tire pressure and/or other tire parameters, such as temperature, are outside recommended ranges. It should also be noted that the steps described herein of the method of the present invention need not be performed in the order described, and indeed may be performed in any order.

From the foregoing description, it can be seen that the present invention provides an improved tire pressure monitoring system and method which overcomes the tire pressure signal jamming problems described above associated with prior art TDMA tire pressure monitoring systems. The present invention provides a system and method that allows for simultaneous transmission of tire pressure signals from multiple transmitters, and at the same frequency. The system and method of the present invention employ spread spectrum technology, preferably through the use of code division multiple access (CDMA). According to the system and method of the present invention, transmitters and a receiver employ CDMA so that multiple tire pressure signals transmitted simultaneously can be received, without disruption of conveying tire pressure information to a vehicle occupant. The system and method of the present invention thereby provide for proper tire pressure monitoring regardless of the proximity of a vehicle equipped with the system and method of the present invention to another vehicle equipped with a tire pressure monitoring system.

While various embodiments of the invention have been illustrated and described, it is not intended that these embodiments illustrate and describe all possible forms of the present invention. Rather, the words used in the specification are words of description rather than limitation, and it is understood that various changes may be made without departing from the spirit and scope of the invention. Indeed, many alternatives, modifications, and variations will be apparent to those skilled in the art in light of the foregoing description, and the present invention is intended to embrace all such alternatives.

What is claimed is:

1. In a vehicle having a plurality of tires, a system for monitoring tire pressure comprising:
    a plurality of tire monitors, each monitor for mounting in one of the plurality of tires, each monitor comprising a sensor for determining tire pressure and a transmitter for transmitting a signal representative of the tire pressure determined;
    a receiver for mounting on board the vehicle for receiving tire pressure signals, wherein the transmitters and the receiver utilize code division multiple access (CDMA) for the tire pressure signals so that tire pressure signals transmitted simultaneously by the transmitters can be received by the receiver, and wherein all of the tire pressure signals are transmitted at a selected frequency; and
    a controller for mounting on board the vehicle, the controller to be provided in communication with the receiver for collecting and processing tire pressure signals, and for generating control signals for use in conveying tire pressure information to a vehicle occupant.

2. The system of claim 1 further comprising a display for mounting on board the vehicle, the display to be provided in communication with the controller for receiving the control signals and displaying the tire pressure information to the vehicle occupant.

3. The system of claim 1 wherein each transmitter includes a battery and, to extend battery life, each transmitter transmits tire pressure signals periodically.

4. The system of claim 1 wherein each tire monitor further includes means for determining tire status, each transmitter is further for transmitting a signal representative of the tire status for receipt by the receiver, the controller is further for collecting and processing the tire status signals, and the control signals are further for use in conveying tire status information to the vehicle occupant.

5. The system of claim 4 further comprising a display for mounting on board the vehicle, the display to be provided in communication with the controller for receiving the control signals and displaying the tire pressure and status information to the vehicle occupant.

6. The system of claim 1 wherein each tire monitor further includes means for determining tire speed, each transmitter is further for transmitting a signal representative of the tire speed for receipt by the receiver, and the controller is further for collecting and processing the tire speed signals, and the control signals are further for use in conveying tire speed information to the vehicle occupant.

7. The system of claim 6 further comprising a display for mounting on board the vehicle, the display to be provided in communication with the controller for receiving the control signals and displaying the tire pressure and speed information to the vehicle occupant.

8. The system of claim 1 wherein each tire monitor further includes means for determining tire temperature, each transmitter is further for transmitting a signal representative of the tire temperature for receipt by the receiver, and the controller is further for collecting and processing the tire temperature signals, and the control signals are further for use in conveying tire temperature information to the vehicle occupant.

9. The system of claim 8 further comprising a display for mounting on board the vehicle, the display to be provided in communication with the controller for receiving the control signals and displaying the tire pressure and temperature information to the vehicle occupant.

10. In a vehicle having a plurality of tires, a method for monitoring tire pressure comprising:
    providing a plurality of tire monitors, each monitor for mounting in one of the plurality of tires, each monitor comprising a sensor for determining tire pressure and a transmitter for transmitting a signal representative of the tire pressure determined;
    providing a receiver for mounting on board the vehicle for receiving the tire pressure signals, wherein the transmitters and the receiver utilize code division multiple access (CDMA) for the tire pressure signals so that tire pressure signals transmitted simultaneously by the transmitters can be received by the receiver, and wherein all of the tire pressure signals are transmitted at a selected frequency.

11. The method of claim 10 further comprising providing a controller for mounting on board the vehicle, the controller to be provided in communication with the receiver for collecting and processing the tire pressure signals, and for generating control signals for use in conveying tire pressure information to a vehicle occupant.

12. The method of claim 10 further comprising providing a display for mounting on board the vehicle, the display to be provided in communication with the controller for receiving the control signals and displaying the tire pressure information to the vehicle occupant.

13. The system of claim 10 where in each transmitter includes a battery and, to extend battery life, each transmitter transmits tire pressure signals periodically.

14. The method of claim 10 wherein each tire monitor provided further includes means for determining tire status, each transmitter is further for transmitting a signal representative of the tire status for receipt by the receiver, the controller is further for collecting and processing the tire status signals, and the control signals are further for use in conveying tire status information to the vehicle occupant.

15. The method of claim 14 further comprising providing a display for mounting on board the vehicle, the display to be provided in communication with the controller for receiving the control signals and displaying the tire pressure and status information to the vehicle occupant.

16. The method of claim 10 wherein each tire monitor provided further includes means for determining tire speed, each transmitter is further for transmitting a signal representative of the tire speed for receipt by the receiver, and the controller is further for collecting and processing the tire speed signals, and the control signals are further for use in conveying tire speed information to the vehicle occupant.

17. The method of claim 16 further comprising providing a display for mounting on board the vehicle, the display to be provided in communication with the controller for receiving the control signals and displaying the tire pressure and speed information to the vehicle occupant.

18. The method of claim 10 wherein each tire monitor provided further includes means for determining tire temperature, each transmitter is further for transmitting a signal representative of the tire temperature for receipt by the receiver, and the controller is further for collecting and processing the tire temperature signals, and the control signals are further for use in conveying tire temperature information to the vehicle occupant.

19. The method of claim 18 further comprising providing a display for mounting on board the vehicle, the display to be provided in communication with the controller for receiving the control signals and displaying the tire pressure and temperature information to the vehicle occupant.

* * * * *